United States Patent [19]

Barrett

[11] 4,307,309

[45] Dec. 22, 1981

[54] BRUSHLESS DYNAMOELECTRIC MACHINE

[76] Inventor: Edward L. Barrett, 506 Malden Ave., LaGrange Park, Ill. 60525

[21] Appl. No.: 116,564

[22] Filed: Jan. 29, 1980

[51] Int. Cl.³ .............................................. H02K 17/42
[52] U.S. Cl. .................................... 310/166; 310/168; 310/184; 310/263; 310/268
[58] Field of Search ............... 310/165, 268, 216, 218, 310/180, 184, 198, 199, 200, 201, 202, 203, 204, 205, 206, 207, 208, 266, 159, 171, 263, 168, 166

[56] References Cited

U.S. PATENT DOCUMENTS 3,320,450  5/1967  Bosco et al. ..................... 310/268 X
4,159,434  6/1979  Kalsi ..................................... 310/168

Primary Examiner—J. V. Truhe
Assistant Examiner—Morris Ginsburg
Attorney, Agent, or Firm—Kinzer, Plyer, Dorn & McEachran

[57] ABSTRACT

A brushless alternator or like dynamoelectric machine, particularly adapted for use in a vehicle, comprising a field coil mounted on the center leg of a stationary core, a rotor shaft extending through the center leg of the core, a first, disc-shaped rotor member mounted on the shaft and facing the center leg of the core across a first large-area axial air gap and having a first set of radially projecting rotor poles, and a second, annular rotor member mounted on the first rotor member, facing an outer flange portion of the core across a second large-area axial air gap and having a second set of axially projecting rotor poles interleaved one-for-one with the first set. The two sets of rotor poles have pole faces aligned in a common radial plane facing an annular array of stator poles across a third large-area axial air gap arranged to balance the magnetic attraction forces to which the rotor is subjected; the stator poles are of laminated construction, formed in pairs and mounted in an annular laminated stator that is in turn mounted on the core by non-magnetic means affording a sealed housing for the machine. The coils of the stator winding are wound in an even number of layers, alternately outside-in and inside-out, with the corresponding layers of adjacent coils interconnected, to afford maximum current capacity in coils of minimum axial length, keeping the axial length of the stator poles to a minimum.

11 Claims, 11 Drawing Figures

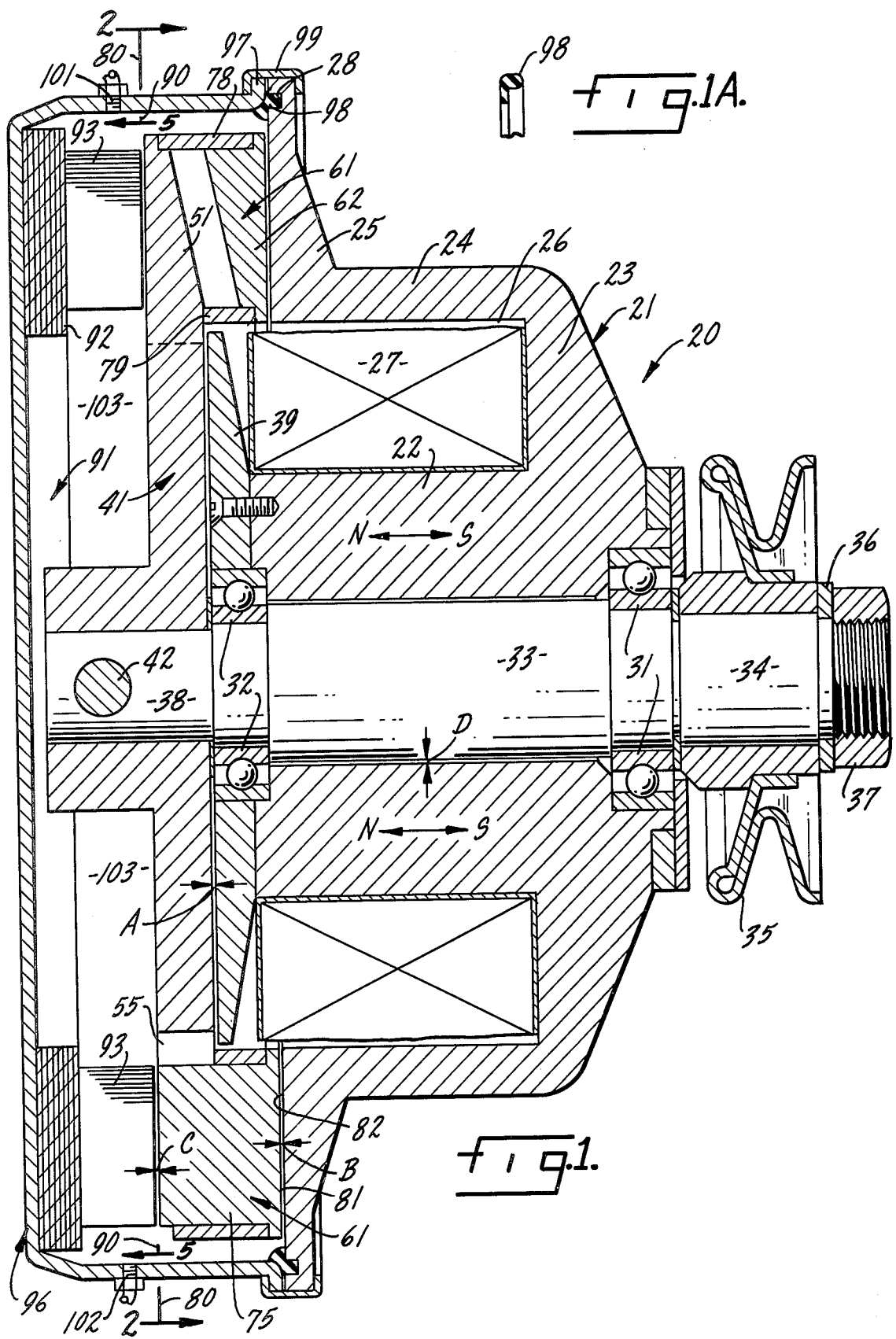

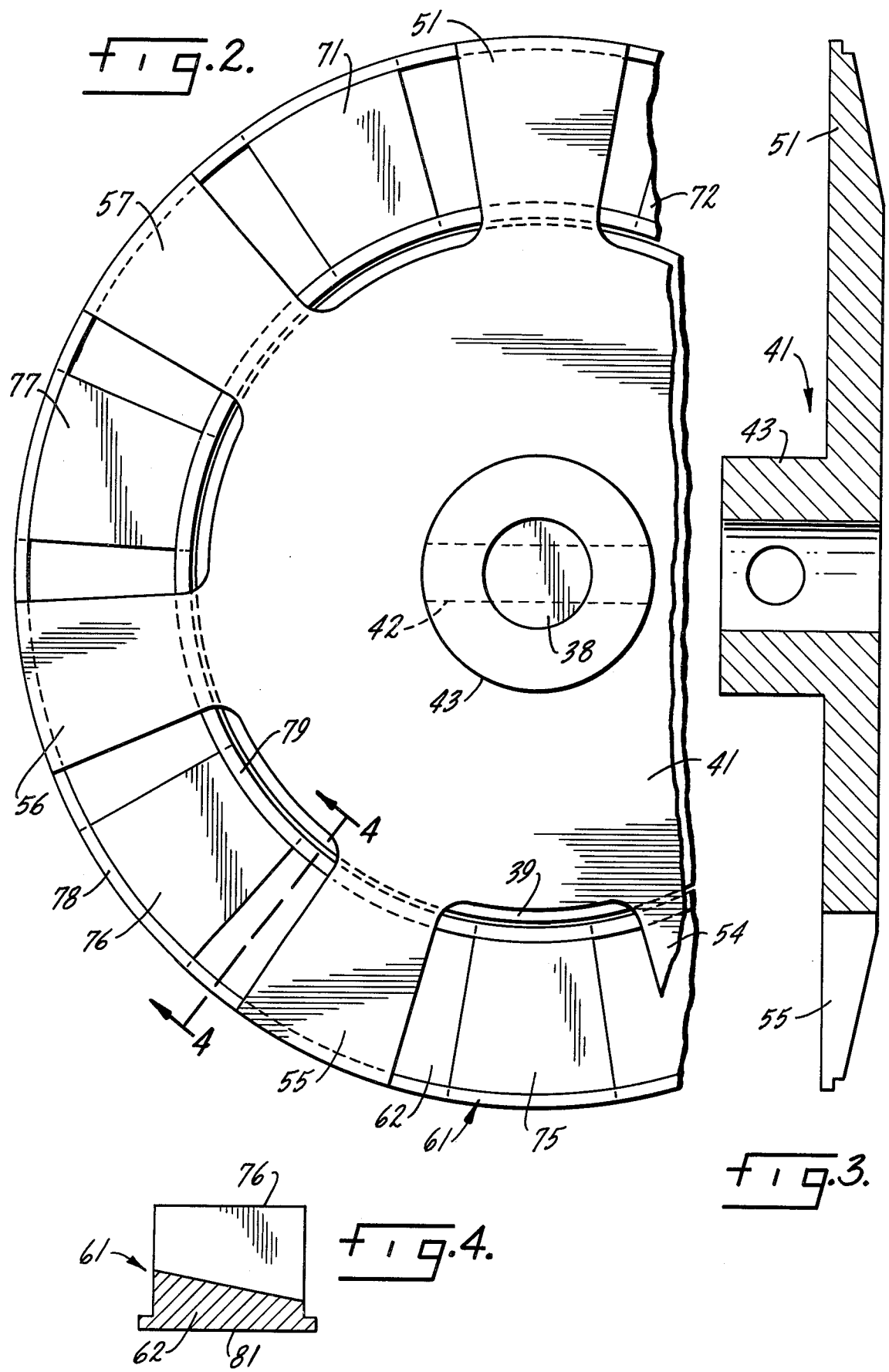

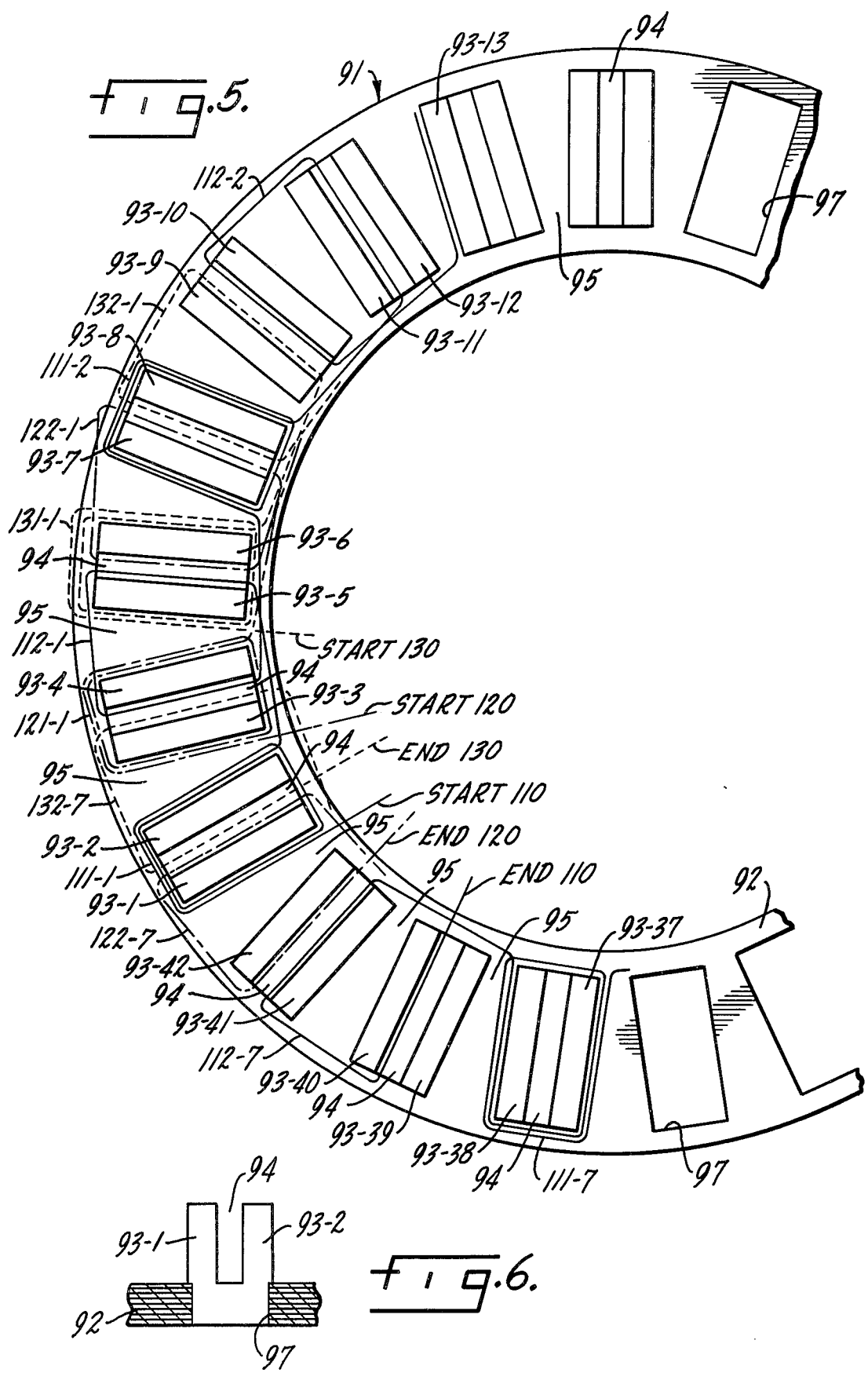

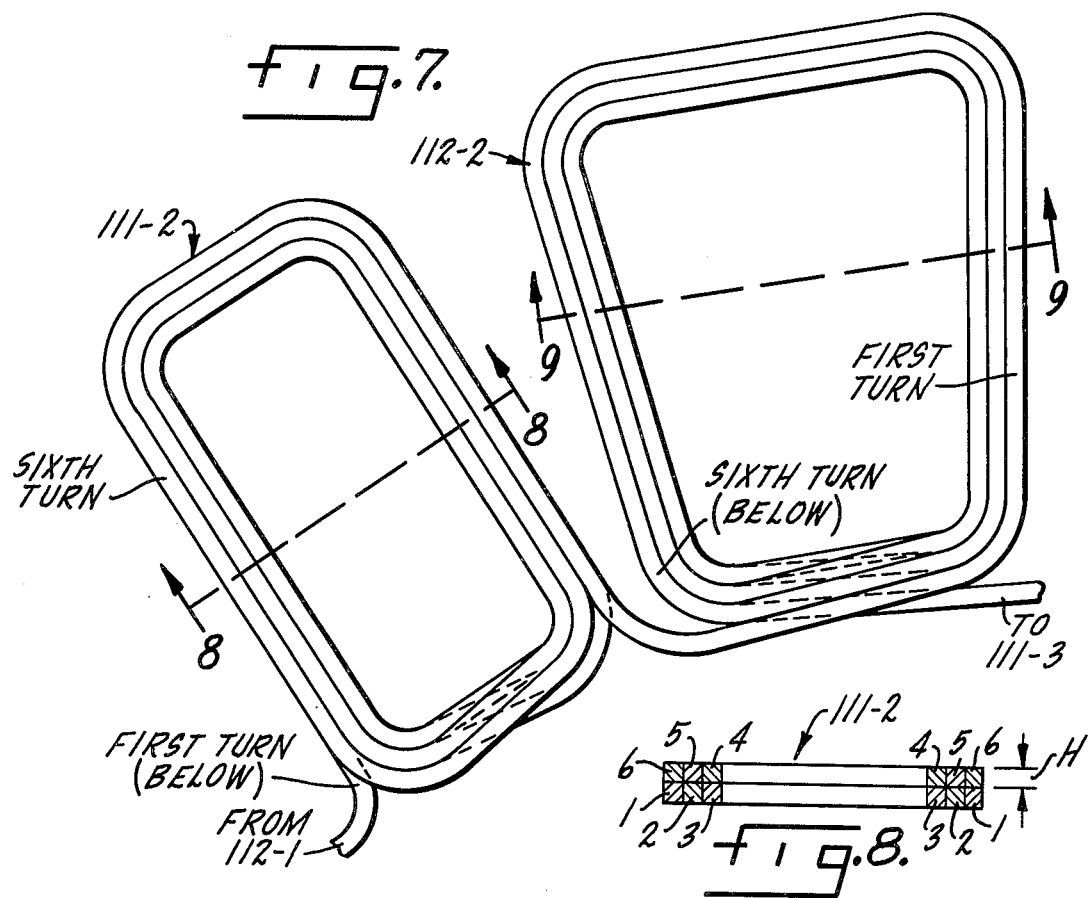
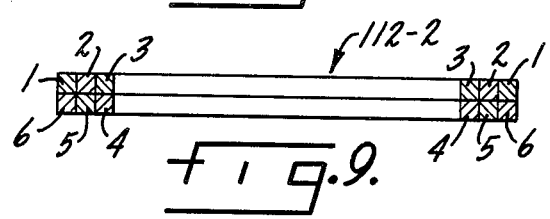
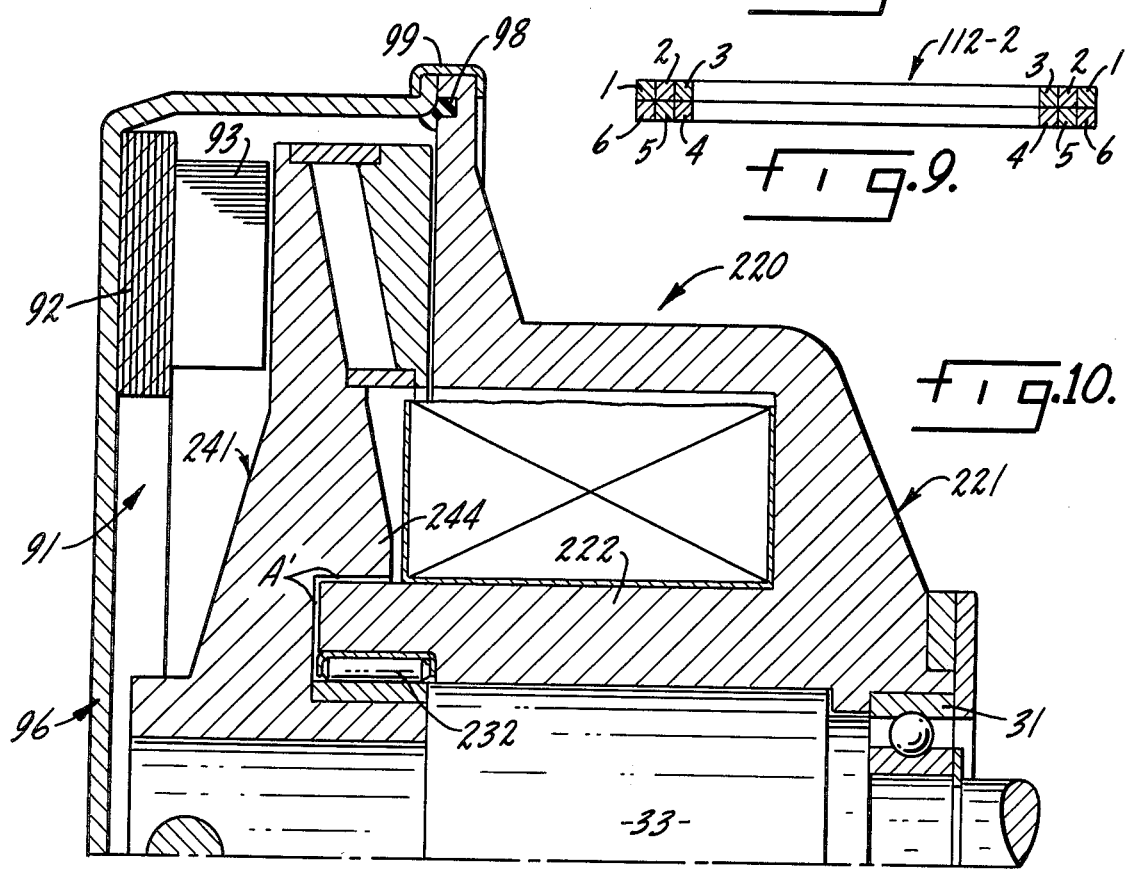

BRUSHLESS DYNAMOELECTRIC MACHINE

BACKGROUND OF THE INVENTION

Alternators are commonly employed as the basic source of electrical power in airplanes, trucks, automobiles, and other vehicles; the alternator output is rectified and is used to charge the vehicle battery and to operate a wide variety of electrical devices. The size, weight, and cost of the alternator are all critical; all should be held to a minimum. Even more important, the alternator must operate with little or no attention over long periods of time, often in a very dirty environment.

Thus, the service requirements imposed upon a vehicle alternator are also quite severe. The load may vary over wide extremes, depending upon the number of electrical devices on the vehicle currently in use (e.g., heater, air conditioner, lighting, instrumentation, radio, etc.). The temperature may range from below 0° F. to over 200° F. Over all of these extremes, the alternator should exhibit good self-regulation and should accommodate rapid changes in any of the operating conditions.

The rotary electromagnetic excitation structure of a vehicle alternator usually comprises a series of alternate north and south rotor poles disposed concentrically with a multi-pole stator and separated from the stator poles by a small air gap. Most vehicle alternators utilize an excitation coil mounted on the rotor, with the exciting current for the coil applied through brushes and slip-ring connections. Vehicle alternators of so-called "brushless" construction are also known; in these, the excitation coil is stationary and the slip-rings and brushes are eliminated. A brushless alternator thus eliminates the wear and maintenance problems almost inevitably associated with brushes and slip-rings. On the other hand, the brushless construction introduces an additional air gap into the magnetic structure of the alternator, with some possible resultant reduction in efficiency.

One excellent example of a brushless alternator construction is set forth in Barrett U.S. Pat. No. 3,493,800, issued Feb. 3, 1970. The bearing arrangement shown in that patent, especially in the embodiment illustrated in FIG. 10, affords superior performance for a variety of applications, particularly in vehicle alternators. However, the magnetic structure is not as efficient as it might be, at least for some critical applications, due to losses in the air gaps between the rotor and the stationary portion of the magnetic excitation structure. Moreover, the interleaved, axially extending "Lundell" type rotor poles used in that machine, which face the stator across a radial air gap, may produce excessive noise due to the continuous fluctuations occurring in the magnetic attraction between the rotor and stator. Furthermore, centrifugal force on the rotor poles tends to change the rotor-stator air gap as a function of rotational speed, adding to the noise problem and imposing a limitation on the maximum permissible rotational speed.

An even better brushless construction is described in Barrett U.S. Pat. No. 3,953,753, issued Apr. 27, 1976, which incorporates the advantageous bearing arrangement of the earlier Barrett patent in an alternator having an unusual stator winding configuration combined with a rotor-stator pole relationship substantially different from conventional machines. The overall combination is more efficient and exhibits better self-regulation than conventional brush-type alternators. However, some problems of noise, cost and performance remain, in part due to continuing use of a radial stator-rotor air gap.

SUMMARY OF THE INVENTION

It is a principle object of the invention, therefore, to provide a new and improved brushless dynamoelectric machine, particularly a three-phase alternator, suitable for use in vehicles and in similar demanding applications, which retains the advantages of the two patented constructions referred to above but which affords significant improvement in size, cost, and performance characteristics.

A particular object of the invention is to effect a significant reduction in size and in the total amount of copper required for a stator winding like that of Barrett U.S. Pat. No. 3,953,753 without reducing the capacity of the machine and with an improvement in its self-regulation characteristics.

Another object of the invention is to increase the efficiency of operation of a brushless alternator by minimizing the magnetic reluctance in the overall excitation structure, utilizing only large-area axial air gaps between the stationary and rotary portions of the machine, in an arrangement that avoids introduction of unbalanced magnetic thrust on the rotor.

A further object of the invention is to provide a new and improved brushless alternator or like dynamoelectric machine using a stator with short, axially directed stator poles, affording improved noise reduction in a construction readily adapted to use in a totally sealed machine that can be operated at high speed in a very dirty environment.

Another object of the invention is to provide a new and improved brushless alternator or like dynamoelectric machine adapted to use of pre-formed winding sections, eliminating any need to form the winding in situ on the rotor.

An additional object of the invention is to provide a new and improved alternator or like dynamoelectric machine, particularly suited for use in vehicles and other demanding applications, that is small in size, low in weight, and inexpensive to construct, that requires a minimum of maintenance, and that nevertheless affords good self-regulation for operation over a wide range of load conditions.

Accordingly, the invention relates to a brushless alternator or like dynamoelectric machine comprising a stationary, annular, magnetic excitation core including a tubular central portion, an integral wall portion extending radially from one end of the central portion, a skirt portion extending from the outer rim of the wall portion back over the central portion in spaced coaxial relation thereto, and a flange portion extending radially outwardly from the free end of the skirt portion; an excitation coil is mounted in encompassing relation to the central portion of the core and a rotor shaft extends through and is journalled in the central portion of the core. A first, generally disc-shaped rotor member is affixed to the shaft, facing the central portion of the core across a first large-area axial air gap, with a first set of rotor poles projecting radially outwardly of the first rotor member; a second, annular rotor member is mounted on the first rotor member by non-magnetic mounting means for rotation therewith and faces the flange portion of the core across a second large-area axial air gap, with a second set of rotor poles projecting axially from the second rotor member into one-for-one interleaved relation with the first set of rotor poles, the rotor poles of both sets having pole faces aligned in a common radial plane facing axially outwardly from the core. The stator includes an annular base, a plurality of stator poles projecting axially from the stator base and having pole faces aligned in a common radial plane, and a winding mounted on the stator poles; non-magnetic stator mounting means are provided for mounting the stator on the core with the stator pole faces facing the rotor pole faces across a third large-area axial air gap, the magnetic attraction between the rotor and the core across the first two air gaps being opposite in direction to and generally balanced by the magnetic attraction between the rotor and the stator across the third air gap.

BRIEF DESCRIPTION OF THE DRAWINGS

FIG. 1 is a longitudinal sectional elevation view of a three-phase brushless alternator constructed in accordance with a preferred embodiment of the present invention;

FIG. 1A is a detail sectional view of an O-ring seal member in relaxed state, prior to installation in the alternator;

FIG. 2 is a transverse sectional elevation view of the rotor, taken approximately along line 2—2 in FIG. 1;

FIG. 3 is a detail sectional view of one rotor member;

FIG. 4 is a detail sectional view of another rotor member;

FIG. 5 is a transverse sectional elevation view of the stator, taken approximately along line 5—5 in FIG. 1, with the stator winding shown schematically;

FIG. 6 is a detail view of the stator pole construction;

FIG. 7 illustrates the winding arrangement employed for two adjacent coils in one section of the stator winding;

FIGS. 8 and 9 are detail cross-sectional views of the two coils shown in FIG. 7; and FIG. 10 is a longitudinal sectional elevation view of a modification of the alternator of FIGS. 1-9.

DESCRIPTION OF THE PREFERRED EMBODIMENTS

FIGS. 1, 2 and 5 illustrate the principal mechanical features of a three-phase brushless alternator 20 constructed in accordance with a preferred embodiment of the present invention.

Alternator 20 includes a stationary magnetic excitation core 21 that comprises a central tubular portion 22 with an integral wall portion 23 extending radially from its right-hand end as seen in FIG. 1. Core 21 further comprises an integral annular skirt portion 24 which extends in an axial direction from the outer rim of wall portion 23, in coaxial spaced encompassing relation to the central portion 22; a flange portion 25 of core 21 extends radially outwardly from the free end of skirt portion 24. Portions 22-24 of magnetic core 21 define an annular coil-receiving cavity 26 encircling the central core portion 22.

A DC excitation coil 27 is mounted in cavity 26 in encompassing relation to the central core portion 22. External leads for coil 27 (not shown) may be brought out through a small hole in the wall portion 23 of core 21. There is no need for slip-rings or brushes in the excitation circuit for coil 27, since core 21 and coil 27 remain stationary in operation of alternator 20.

Two ball bearings 31 and 32 are mounted in the opposite ends of the central aperture through the central core portion 22. Other types of bearings can be used; the bearings should be of a type that can accommodate some thrust loading. Bearings 31 and 32 are utilized to journal a rotor shaft 33 in alternator 20, the shaft 33 extending axially through the center core portion 22. Shaft 33 may be formed of magnetic material because it can constitute a part of the magnetic excitation structure, as described more fully hereinafter. There is a short air gap D (e.g. 0.003 inch) between shaft 33 and the encompassing core portion 22.

One end 34 of shaft 33 projects outwardly of core 21 and carries a pulley 35 or other suitable drive connection that affords a means for rotating the shaft. Pulley 35 may be mounted on shaft extension 34 by any suitable means; in the illustrated construction, the pulley mounting arrangement includes a lock washer 36 and a retaining nut 37, nut 37 being threaded onto the outer end of shaft extension 34.

The magnetic excitation structure of alternator 20 includes a first rotor member 41, FIGS. 1-3. Rotor member 41 comprises a disc of magnetic material which is affixed to the end 38 of shaft 33 opposite the wall portion 23 of core 21. A press fit should be used between rotor member 41 and shaft end 38. Appropriate means may also be provided to positively prevent relative rotation between rotor member 41 and shaft 33; in the illustrated construction, the first rotor member 41 is pinned to the shaft by a pin 42 that extends through a hub 43 on the rotor member and through the end 38 of the shaft. An annular flux distribution member 39 is fixedly mounted on core 21 and extends radially outwardly, as an extension of the central core portion 22, adjacent the first rotor member 41. Thus, rotor member 41 effectively faces the central portion 22 of the core across a first large-area axial air gap A. In a 5KVA alternator, gap A may be approximately 0.006 inch. As best shown in FIG. 2, the first rotor member 41 includes seven integral, radially projecting rotor poles 51-57. The number of rotor poles is not critical, and may range from two to eight or even more.

Alternator 20 further comprises a second rotor member 61. Rotor member 61 includes a continuous ring 62 of magnetic material having seven integral, axially projecting rotor poles 71-77 (see FIGS. 2 and 4). This second set of rotor poles 71-77 is disposed in spaced interleaved relation, one-for-one, with the poles 51-57 of the first rotor member 41. The outermost surfaces of the rotor poles 51-57 and 71-77 are all located in a common radial plane 80 (FIG. 1).

Non-magnetic mounting means are provided for mounting the second rotor member 61 on the first rotor member 41 for rotation therewith. In the illustrated construction, this non-magnetic mounting means comprises a pair of mounting rings 78 and 79 that are brazed, soldered, or otherwise secured to both rotor members. Another mounting arrangement, not illustrated, that may be adopted for mass production purposes, comprises incorporation of the two rotor members 41 and 61 in a mold and subsequent die casting of a non-magnetic metal ring joining the two members in a single unitary rotor structure including the rotor members 41 and 61 and their poles 51-57 and 71-77.

The continuous ring 62 of rotor member 61 faces the core flange 25 across a second large-area axial air gap B. The surfaces 81 of ring 62 and 82 of flange 25 may be machined to moderately close tolerances to avoid substantial variations in the air gap B; an air gap of approximately 0.010 inch is permissible in a 5KVA alternator.

Alternator 20 further comprises a stator 91 (FIGS. 1, 5 and 6). Stator 91 includes a laminated annular magnetic stator base 92 having a plurality of laminated stator poles 93 projecting axially therefrom. In the illustrated machine, there are forty-two stator poles 93, a 3:1 ratio as compared with the total number of rotor poles. Furthermore, each rotor pole is dimensioned to span approximately two stator poles, maintaining the advantageous relationship described in Barrett U.S. Pat. No. 3,953,753. The stator poles 93 are preferably formed in pairs, as indicated by poles 93-1 and 93-2 in FIG. 6, and are press fit into spaced apertures 97 in stator base 92. Each stator pole in a pair is separated from the other by a narrow slot 94 of uniform width. There is a somewhat wider, diverging slot 95 between each pair of stator poles; see FIG. 5.

An output winding, comprising three winding sections 110, 120 and 130, is mounted on stator 91 in the slots 94 and 95 between the stator poles 93, as shown schematically in FIG. 5. The first coil 111-1 of the first stator winding section 110 is a rectangular coil wound clockwise around a first pair of stator poles 93-1 and 93-2, the sides of the coil 111-1 lying in two of the divergent inter-pole slots 95. The next coil in section 110 is coil 112-1, which is of trapezoidal configuration and is wound counterclockwise around two poles 93-4 and 93-5, skipping pole 93-3. Thus, the sides of coil 112-1 are disposed in tow of the center slots 94 between paired poles. The next coil in winding section 110 is again a rectangular coil 111-2, wound clockwise around a pair of poles 93-7 and 93-8, skipping pole 93-6. The succeeding coil 112-2 is like coil 112-1, being of trapezoidal configuration and encompassing stator poles 93-10 and 93-11 after skipping pole 93-9 and is wound in a counterclockwise direction. Winding 110 concludes with a rectangular clockwise wound coil 111-7 encircling poles 93-37 and 93-38 and a trapezoidal counterclockwise-wound coil 112-7 around poles 93-40 and 93-41. Winding section 110 has no coil around pole 93-42.

The second winding 120 on stator 91 starts with a rectangular clockwise-wound coil 121-1 encompassing stator poles 93-3 and 93-4, this winding section being shown in phantom lines. The second coil in winding section 120 is wound counterclockwise around poles 93-6 and 93-7, skipping pole 93-5. Winding 120 concludes with a trapezoidal coil 122-7 wound counterclockwise around poles 93-42 and 93-1.

The third stator winding 130, shown in dash lines in the schematic illustration of FIG. 5, begins with a rectangular coil 131-1 wound clockwise around the poles 93-5 and 93-6 of the stator. The next coil in this winding is the trapezoidal coil 132-1, wound counterclockwise around stator poles 93-8 and 93-9 after skipping pole 93-7. The third winding of the stator terminates, like the others, in a trapezoidal coil 132-7 that is wound counterclockwise around poles 93-2 and 93-3.

From the foregoing description, it will be apparent that the winding arrangement used in the alternator of the present invention corresponds, in all essential respects, to that shown in FIG. 5 of the aforementioned Barrett Pat. No. 3,953,753. In alternator 20, however, the winding arrangement has been modified to minimize the height of each of the stator coils and thus reduce the overall height requirement for the stator poles 93. Thus, as shown in FIGS. 7-9, in an alternator with six turns per coil, each of the coils is wound outside-in in a first layer and then inside-out in a second layer, affording coils of cross sectional configuration as shown in FIGS. 8 and 9. In this winding arrangement, starting with the rectangular coil 111-2 of the first winding 110, FIGS. 7 and 8, the first turn is located on the bottom of the coil and on the outside of the first layer and the sixth and final turn is disposed on the periphery of the second layer of the coil, located on top of the first layer. In the next coil in the same winding section, coil 112-2, FIGS. 7 and 9, the first turn extends around the periphery of the upper layer and the last turn is located on the outside of the bottom layer. This sequence is carried on throughout the entire winding section and is utilized in all three of the winding sections 110, 120, and 130. In each instance, each axially outermost layer of each coil is connected directly to the corresponding layer in an adjacent coil, further minimizing the lengths of the inter-coil connections.

The net saving, using the winding arrangement shown in FIGS. 7-9, with respect to the axial lengths of the coils, is equal to the axial height H of the wire or ribbon used for the winding. This is not insignificant, however, since only a few turns of copper wire or ribbon or relatively large cross-sectional dimensions are used in these windings. Thus, in the typical winding arrangement shown in FIGS. 7-9, with only six turns per coil, the height saving effected amounts to one third of the overall axial height otherwise required for the coil. This permits the use of stator poles 93 of minimal axial length, keeping the axial length of the machine to a minimum. More importantly, an appreciable cost saving is realized, since the overall length of copper required for the winding is materially reduced. Indeed, in a 5KVA alternator, the axial length of the stator poles may be reduced by as much as 3/16 inch, shortening the flux paths in stator 91 by $\frac{3}{8}$ inch, an important consideration in a stator having flux paths that are already substantially shorter than in competitive alternators.

Furthermore, the coil construction described and illustrated in connection with FIGS. 7-9 results in the lowest possible resistance for the stator winding, much lower than in other constructions. In the output circuits of an alternator, regulation is a very important consideration, and the resistance of the stator winding is the most important factor affecting regulation. In a 4KVA alternator, the preferred construction for the winding utilizes a 1/16 inch square copper ribbon, affording a cross-section equal to a No. 13 round wire but fitting into the smaller space normally provided for a No. 14 wire. For a 5KVA alternator, the copper ribbon employed for the stator windings would preferably be of rectangular cross-section, 1/16 inch by 3/32 inch.

Stator 91 is fixedly mounted on core 21 in spaced relation to the rotor poles 51-57 and 71-77 of the two rotor members 41 and 61. As shown in FIG. 1, a cup-shaped non-magnetic housing member 96 is used for this purpose. Housing member 96 constitutes a cover for one end of alternator 20. It supports stator 91 with the pole surfaces of stator poles 93 aligned in a common radial plane 90, facing the rotor pole faces across a third large-area axial air gap C. In a 5KVA machine gap C, like gap B, may be about 0.010 inch.

The rim of the cup-shaped housing member 96 comprises a flange 97 that engages the outer rim of the core flange 25 as shown in FIG. 1. An O-ring seal 98 of generally L-shaped cross sectional configuration (FIGS. 1 and 1A) is fitted into an annular slot 28 in the core flange 25. The housing member 96 is firmly mounted on core 21 by a channel-shaped clamping ring 99 pressed onto the housing flange 97 and the core flange 25. Sealing ring 98 is squeezed between the inner corner of housing flange 97 and the inner corner of the slot 28 in core flange 25 to afford a complete and effective peripheral seal for a chamber 103, defined by housing member 96, that encompasses the two rotor members 41 and 61 and the stator 91. Housing member 96 may be provided with suitable inlet and outlet openings 101 and 102 for circulation of oil through chamber 103 for cooling purposes. With the illustrated seal construction, it should be noted, there is no opportunity for entrance of dust, mud, dirt, or other contaminants into alternator 20.

In considering the operation of alternator 20, it may be assumed that a DC excitation voltage is applied to coil 27. With coil 27 energized, a magnetic flux is generated in the central tubular portion 22 of core 21 as generally indicated by the arrows N-S. If shaft 33 is of magnetic material, some flux, similarly directed, is developed in the shaft itself. Of course, if the polarity of the DC excitation to coil 27 were reversed, the polarity of the magnetic flux would be reversed, but there would be no change in performance.

With the indicated polarization, rotor member 41 receives magnetic flux across gap A so that each of its radially extending poles 51–57 becomes a north pole. Similarly, the magnetic coupling of the second rotor member 61 to core flange 25 across gap B results in each of the rotor poles 71–77 becoming a south pole. Both of the gaps A and B are large-area axial air gaps; the magnetic coupling across these two gaps tends to pull the rotor to the right toward core 21 as seen in FIG. 1.

Virtually all of the magnetic flux from the rotor, however, is coupled to stator 91, through the stator poles 93, across the third large-area axial air gap C between the stator poles and the rotor poles. The resultant magnetic attraction tends to pull the rotor to the left, as seen in FIG. 1, and effectively counterbalances the magnetic attraction tending to deflect the rotor toward the alternator core. This balanced arrangement avoids the imposition of excessive thrust loads on the bearings of the alternator, which might otherwise cause excessive bearing wear and lead to premature failure of the alternator. Some imbalance in the magnetic attraction is likely to be present if shaft 33 is formed of magnetic material, due to the additional flux (north polarity as shown) that is supplied to the first rotor member 41 through radial gap D, bypassing the axial air gap A. This is quite limited in nature, however, and is effectively compensated by use of a gap A somewhat smaller than gap C. Moreover, a minor imbalance may be beneficial in that it affords a net resultant force on the rotor, in an axial direction, sufficient to avoid any "hunting" without imposing an undue load on the bearings.

The rotor poles in the illustrated construction, particularly poles 71–77, are of course subject to variations in centrifugal force with changes in the speed of operation, which are frequent in many vehicular applications. But this does not affect any of the air gaps A, B or C. Indeed, with the mounting rings 78 and 79 tying the two rotor members 41 and 61 together, at the periphery of the rotor structure, the rotor members perform much like a single, integrated piece of metal, with no free pole ends likely to vibrate. This construction, together with the balancing of the magnetic attraction forces discussed above, holds noise to a bare minimum.

Because each of the air gaps A, B and C is very large in area, the reluctance across these air gaps is held to a minimum. Consequently, a high efficiency is maintained for the complete magnetic excitation system of alternator 20. Thus, even though alternator 20 is of brushless construction and includes an additional air gap as compared with a more conventional machine, the magnetic efficiency is high enough so that performance comparable to a conventional brush-type alternator is readily achieved. The magnetic efficiency is also assisted by the use of the rotor-stator pole configuration described and illustrated above, with each rotor pole aligned with the total effective surface area of two stator poles.

As noted above, alternator 20 utilizes the general winding arrangement described in Barrett U.S. Pat. No. 3,953,753, with each coil of each winding section encompassing just two stator poles and with each coil separated from the next coil in the winding section by a stator pole that is not encircled by a coil from that winding section. This arrangement, when taken in conjunction with the distinctive flat multi-turn coils and the alternating outside-in, inside-out winding arrangement for those coils, with all coil leads located at the periphery of the coils, provides a material reduction in the total amount of conductor material in the stator winding. It also provides an appreciable reduction in winding resistance, with resultant improved self-regulation. Furthermore, the overall stator pole and winding construction allows for use of pre-formed winding sections that can be readily slipped into place on the stator poles, avoiding any need for forming the stator coils in situ on the stator.

The structural features of the invention would be of material advantage in an air-cooled alternator; they are of even greater advantage as applied to an oil-cooled machine. Thus, the described construction lends itself readily to a totally sealed alternator or other dynamoelectric machine, with only the one peripheral seal 98 required. This is of substantial advantage as applied to the alternator or other machine used in vehicles and in other dirty environments, since the entire alternator is sealed from the enviroment.

FIG. 10 illustrates a modified alternator 220 constructed in accordance with another embodiment of the invention, similar in most respects to the alternator 20 described above. Thus, the stator 91, the non-magnetic housing 96, the seal 98, and the clamping ring 99 may be the same as described above. The stator winding may also be as previously described.

A principal change in the construction for alternator 220 lies in the elimination of the flux distributor 39 of the previously described embodiment. In machine 220, the central tubular portion 222 of the stationary magnetic core 221 is lengthened somewhat in an axial direction and the configuration of the first rotor member 241 is modified so that it includes a portion 244 that extends back over the end of the core portion 222. Thus, in this embodiment the first rotor member is coupled to the core through a cup-shaped air gap A' having both a large-area axial portion and a large-area radial portion. Another change effected in this embodiment is the use of a needle bearing 232 instead of the roller bearing 32 of the previously described embodiment. In all other respects, the construction remains essentially the same and performance is essentially similar.

I claim:
1. A brushless alternator or like dynamoelectric machine comprising:
   a stationary, annular, magnetic excitation core including a tubular central portion, an integral wall portion extending radially outwardly one end of the central portion, a skirt portion extending from the outer rim of the wall portion back over the central portion in spaced coaxial relation thereto, and a flange portion extending radially outwardly from the free end of the skirt portion;

an excitation coil mounted in encompassing relation to the central portion of the core;

a rotor shaft extending through and journalled in the central portion of the core;

a first, generally disc-shaped rotor member affixed to the shaft and facing the central portion of the core across a first large-area axial air gap;

a first set of rotor poles projecting radially outwardly of the first rotor member;

a second, annular rotor member, mounted on the first rotor member by non-magnetic mounting means for rotation therewith and facing the flange portion of the core across a second large-area axial air gap;

a second set of rotor poles projecting axially from the second rotor member into one-for-one interleaved relation with the first set of rotor poles, the rotor poles of both sets having pole faces aligned in a common radial plane facing axially outwardly from the core;

a stator including an annular base, a plurality of stator poles projecting axially from the stator base and having pole faces aligned in a common radial plane, and a winding mounted on the stator poles;

and non-magnetic stator mounting means for mounting the stator on the core with the stator pole faces facing the rotor pole faces across a third large-area axial air gap, the magnetic attraction between the rotor and the core across the first two air gaps being opposite in direction to and generally balanced by the magnetic attraction between the rotor and the stator across the third air gap.

2. A dynamoelectric machine according to claim 1 in which:

the stator base comprises an axially oriented stack of annular laminations having a plurality of angularly displaced pole apertures therein; and each stator pole comprises a stack of pole laminations press fit into one of the apertures in the stator base, the pole laminations being oriented at an angle of 90° to the base laminations.

3. A dynamoelectric machine according to claim 2 in which each stator pole is paired with another, each stack of pole laminations forming two stator poles separated by an intervening slot.

4. A dynamoelectric machine according to claim 1, claim 2, or claim 3 in which the stator winding includes a plurality of angularly displaced winding sections, each section including a series of interconnected coils, each coil including an even number of layers, in an axial direction, and being wound outside-in and inside-out in alternate layers so that the first and last turns of the coil are located on the periphery of the coil, thereby minimizing the axial length of each coil.

5. a dynamoelectric machine according to claim 4 in which each axially outermost layer of each coil is connected directly to the corresponding layer in each adjacent coil in the series, minimizing the lengths of all inter-coil connections.

6. A dynamoelectric machine according to claim 5 in which each coil encompasses two adjacent stator poles and is separated from the next coil in the series by a stator not encompassed by a coil of the same winding section, with adjacent coils in each series wound in opposite directions.

7. A dynamoelectric machine according to claim 5 in which the stator mounting means comprises a cup-shaped non-magnetic housing sealed to the core to afford a sealed chamber encompassing the rotor, the stator, and all three air gaps.

8. A dynamoelectric machine according to claim 1, claim 2, or claim 3 in which the stator mounting means comprises a cup-shaped non-magnetic housing sealed to the core to afford a sealed chamber encompassing the rotor, the stator, and all three air gaps.

9. A winding for the stator of a dynamoelectric machine, the stator comprising an annular base and a plurality of stator poles projecting therefrom, the stator winding comprising a plurality of angularly displaced winding sections, each section including a series of interconnected coils, each coil including an even number of layers, in an axial direction, and being wound outside-in and inside-out in alternate layers so that the first and last turns of the coil are located on the periphery of the coil, thereby minimizing the axial length of each coil.

10. A winding for the stator of a dynamoelectric machine, according to claim 9, in which each axially outermost layer of each coil is connected directly to the corresponding layer in each adjacent coil in the series, minimizing the lengths of all inter-coil connections.

11. A winding for the stator of a dynamoelectric machine according to claim 10 in which each coil is adapted to encompass two adjacent stator poles and to be separated from the next coil in the series by a stator pole not encompassed by a coil of the same winding section, with adjacent coils in each series wound in opposite directions.

* * * * *